(12) United States Patent
Thomas

(10) Patent No.: US 11,603,895 B2
(45) Date of Patent: Mar. 14, 2023

(54) MOUNTING FOR A GUIDE PIN OF A DISC BRAKE

(71) Applicant: Meritor Heavy Vehicle Braking Systems (UK) Limited, Cwmbran Gwent (GB)

(72) Inventor: Paul Thomas, Cwmbran Gwent (GB)

(73) Assignee: Meritor Heavy Vehicle Braking Systems (UK) Limited, Cwmbran (GB)

( * ) Notice: Subject to any disclaimer, the term of this patent is extended or adjusted under 35 U.S.C. 154(b) by 42 days.

(21) Appl. No.: 16/986,385

(22) Filed: Aug. 6, 2020

(65) Prior Publication Data

US 2021/0048081 A1 Feb. 18, 2021

(30) Foreign Application Priority Data

Aug. 16, 2019 (EP) .................................... 19192145

(51) Int. Cl.
*F16D 55/2265* (2006.01)
*F16D 65/00* (2006.01)
*F16D 55/00* (2006.01)

(52) U.S. Cl.
CPC ... *F16D 65/0087* (2013.01); *F16D 55/22655* (2013.01); *F16D 65/0056* (2013.01); *F16D 65/0068* (2013.01); *F16D 2055/0008* (2013.01); *F16D 2055/0016* (2013.01)

(58) Field of Classification Search
CPC ..... F16D 55/225–227; F16D 55/22655; F16D 65/0087; F16D 65/0056; F16D 65/0068; F16D 2055/0008; F16D 2055/0016
USPC .......................................... 188/73.44, 73.45
See application file for complete search history.

(56) References Cited

U.S. PATENT DOCUMENTS

| 4,372,428 | A | * | 2/1983 | Delaunay | F16D 55/22655 188/73.34 |
| 4,401,194 | A | * | 8/1983 | Klassen | F16D 55/227 188/73.44 |
| 6,026,938 | A | * | 2/2000 | Demoise, Jr. | F16D 55/22655 188/73.35 |
| 10,221,904 | B2 | * | 3/2019 | Knoop | F16D 65/0087 |
| 10,801,566 | B2 | * | 10/2020 | Taylor | F16D 65/0087 |
| 2007/0215418 | A1 | * | 9/2007 | Wirth | F16D 65/123 188/218 XL |
| 2015/0323022 | A1 | * | 11/2015 | Thomas | B23B 41/00 188/73.45 |

(Continued)

FOREIGN PATENT DOCUMENTS

DE 102006002441 A1 7/2007
DE 102007001732 A1 2/2008

(Continued)

OTHER PUBLICATIONS

Extended European Search Report dated Feb. 25, 2020, for related European Appln. No. EP19192145.1; 7 Pages.

(Continued)

*Primary Examiner* — Christopher P Schwartz
(74) *Attorney, Agent, or Firm* — Brooks Kushman PC

(57) ABSTRACT

A mounting for a guide pin of a disc brake and method of mounting. A mounting portion of a guide pin may have a first polygonal cross-sectional profile. A receiving portion of a brake carrier may receive the mounting portion and may have cross-sectional profile that is different than the first polygonal cross-sectional profile.

16 Claims, 17 Drawing Sheets

(56) References Cited

U.S. PATENT DOCUMENTS

| | | |
|---|---|---|
| 2016/0273596 A1 | 9/2016 | Gaye et al. |
| 2016/0356326 A1* | 12/2016 | Knoop .............. F16D 55/22655 |
| 2017/0284488 A1 | 10/2017 | Crippa et al. |
| 2018/0347651 A1 | 12/2018 | Hacklberher |
| 2019/0162256 A1 | 5/2019 | Taylor et al. |
| 2020/0256410 A1* | 8/2020 | Willey ................ F16D 65/0087 |
| 2021/0048078 A1* | 2/2021 | Knoop ................ F16D 65/0087 |

FOREIGN PATENT DOCUMENTS

| | | |
|---|---|---|
| EP | 0046432 A2 | 2/1982 |
| EP | 2369198 A1 | 9/2011 |
| EP | 2942541 A1 | 11/2015 |
| EP | 3051163 A1 | 8/2016 |
| EP | 3492768 A1 | 6/2019 |
| GB | 2093135 A | 8/1982 |

OTHER PUBLICATIONS

Office Action for Corresponding China Patent Application No. 202010806751.8, dated Nov. 29, 2021, 9 pages.

* cited by examiner

MOUNTING FOR A GUIDE PIN OF A DISC BRAKE

TECHNICAL FIELD

The present teachings relate to a disc brake, and particularly but not exclusively to a mounting for a guide pin of a disc brake.

BACKGROUND

Disc brakes are commonly used for braking heavy vehicles such as trucks, buses and coaches.

Heavy vehicle disc brakes typically comprise a brake carrier, a brake caliper and a rotor. The brake carrier is arranged to carry brake pads on each side of the rotor. The brake caliper is slidably mounted on the brake carrier by at least one guide pin, such that when the disc brake is actuated, the brake caliper is able to slide with respect to the brake carrier. As the brake caliper slides inboard, the brake pads are urged onto the opposing faces of the rotor in a clamping action and a braking action is affected.

The guide pin is located in a bore disposed in the brake caliper so that the brake caliper can slide along the guide pin. Typically, each guide pin comprises a smooth outer guide sleeve along which the brake caliper slides and a guide bolt which extends through the guide sleeve and is screwed into a threaded receiving hole of the brake carrier to retain the guide pin.

This arrangement has been proven over many years of usage. However, it has been recognized that in certain testing conditions, specifically when a vehicle undergoes a significant number of forward and reverse movements, there is a risk that the guide bolt of the disc brake may rotate and loosen from the threaded receiving hole of the carrier.

Previous attempts to solve this problem have utilized lock patches to inhibit loosening of the guide bolt.

However, the present inventors have recognized that this approach in effect deals with a symptom of the problem rather than the cause. The present inventors have also identified that the cause of the loosening bolt problem is the rotation of the guide sleeve and the rotation of the guide sleeve being frictionally transmitted into rotation of the bolt.

The present teachings seek to overcome or at least mitigate the problems of the prior art.

SUMMARY

A first aspect provides a mounting for a guide pin of a disc brake, wherein the guide pin is configured to slidably support a disc caliper, the mounting comprising: a mounting portion of the guide pin comprising a first, polygonal cross-sectional profile; and a receiving portion of a brake carrier configured to receive the mounting portion, the receiving portion comprising a second cross-sectional profile that is different to the first cross-sectional profile of the mounting portion; and wherein the mounting portion comprises at least one mating edge region configured to form an interference engagement with the receiving portion when the mounting portion is received in the receiving portion.

Due to the mis-matching profiles, at least one mating region of the mounting portion abuts the receiving portion, forming an interference fit between the guide pin and the brake carrier. The interference fit is able to substantially inhibit rotation and slippage of the guide pin within the brake carrier. The mounting is thereby able to counter rotational torque acting on the guide pin and the risk of loosening is reduced.

The mating edge region may comprise an edge face of the mounting portion. Alternatively, the mating edge region may comprise an intersection between adjacent edge faces of the mounting portion.

The at least one mating region of the mounting portion may be selected according to the desired interference engagement.

The mating edge region and/or the receiving portion may be deformable to achieve interference engagement.

The mounting portion may comprise a first mating edge region and a second, opposing mating edge region configured to form an interference engagement with corresponding opposing regions of the receiving portion.

The mounting portion may comprise at least one non-mating region configured to form a clearance between the mounting portion and the receiving portion when the mounting portion is received in the receiving portion. The clearance may be defined between an edge face of the mounting portion and inner edge of the receiving portion.

The clearance between the mounting portion and the receiving portion aids insertion of the mounting portion into the receiving portion.

The mounting portion may have a regular polygonal cross-sectional profile or an irregular polygonal cross-sectional profile. The mounting portion may have a substantially triangular, square, rectangular, hexagonal, or octagonal cross-sectional profile. Any one of a number of polygonal profiles can provide suitable interference engagement.

The cross-sectional profile of the receiving portion may be substantially circular or may be polygonal.

The cross-sectional profiles of the mounting portion and the receiving portion are selected to sufficiently mis-match, such that interference engagement can be achieved between the at least one mating edge region and the receiving portion.

A second aspect relates to a disc brake comprising: a brake carrier; a caliper; at least one guide pin; a mounting for the at least one guide pin according to the first aspect.

The guide pin may further comprise a guiding portion along which the caliper can slide during operation of the disc brake. The mounting portion and guiding portion of the guide pin may have the same profile to simplify manufacturing. For example, the guide pin may have a constant polygonal cross-sectional profile substantially along its length.

The guide pin may comprise a sleeve and a fastener to secure the sleeve to the brake carrier; wherein the sleeve comprises the mounting portion. As a result, the sleeve forms an interference engagement with the brake carrier and the rotation of the sleeve is restricted. By restricting the rotation of the sleeve relative to the brake carrier, the transmission of rotation from the sleeve to the fastener is restricted and the risk of loosening the fastener is reduced. The sleeve may have a constant polygonal cross-sectional profile substantially along its length. The mounting portion may be a flange arranged at a first end of the sleeve.

The guide pin may comprise a monolithic body; and the mounting portion may be arranged at the first end of the body.

A third aspect relates to a method of mounting a guide pin of a disc brake comprising: providing a mounting portion of the guide pin comprising a first, polygonal cross-sectional profile and having at least one mating edge region; providing a receiving portion of a brake carrier comprising a second cross-sectional profile that is different to the first cross-sectional profile; and locating the mounting portion in the receiving portion and forming an interference engagement between the at least one mating edge region and the receiving portion.

A further aspect provides a mounting for a guide pin of a disc brake, wherein the guide pin is configured to slidably support a disc brake caliper, the mounting comprising: a mounting portion of the guide pin comprising a first cross-sectional profile; and a receiving portion of a brake carrier configured to receive the mounting portion, the receiving portion comprising a second cross-sectional profile that is different to the first cross-sectional profile of the mounting portion; wherein at least one of the first and second cross-sectional profiles is polygonal; and wherein the mounting portion comprises at least one mating edge region configured to form an interference engagement with the receiving portion when the mounting portion is received in the receiving portion.

BRIEF DESCRIPTION OF THE DRAWINGS

For a better understanding of the teachings and to show how they may be carried into effect, reference will now be made by way of example only, to the accompanying drawings, in which.

DETAILED DESCRIPTION

Figure 1:
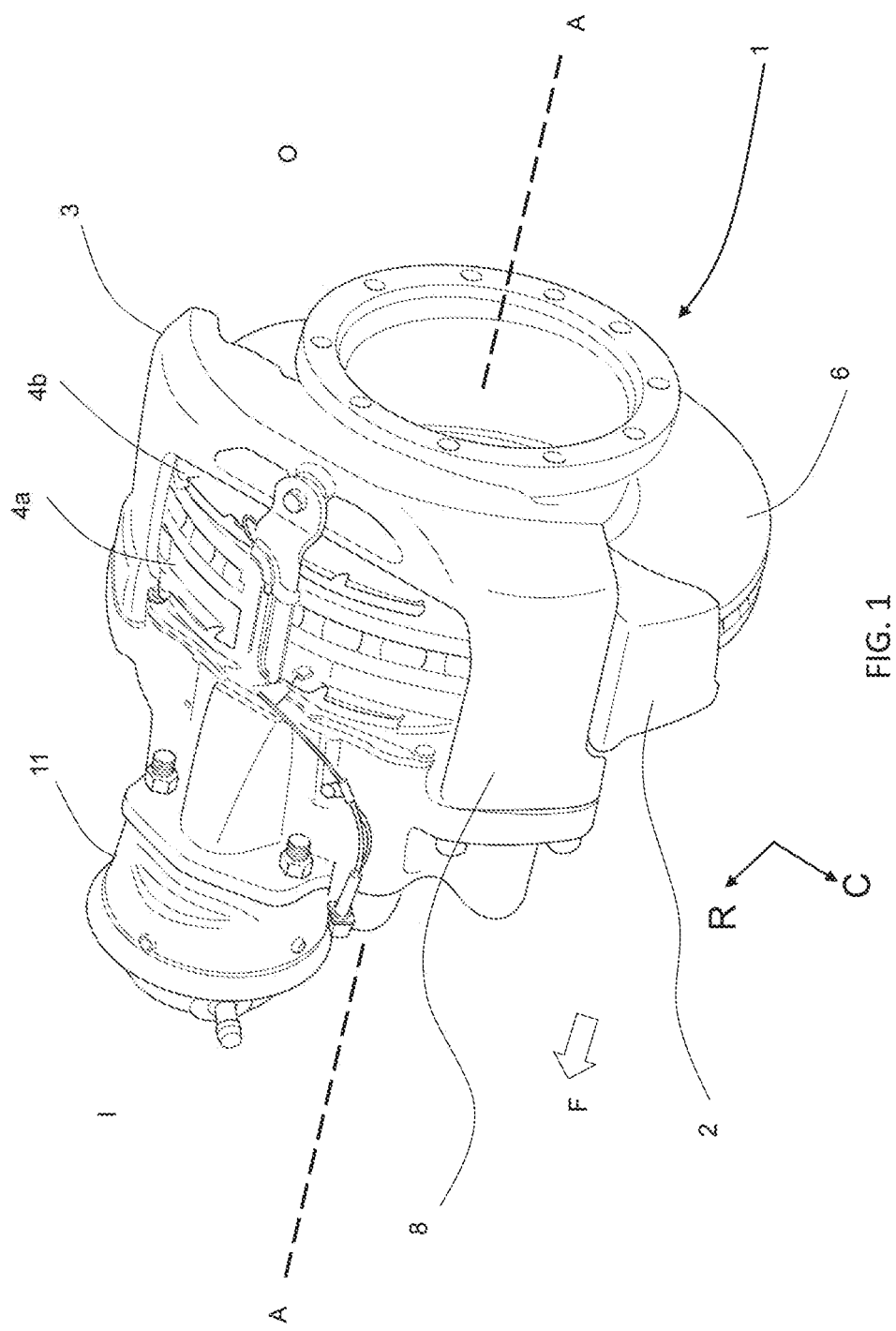
FIG. 1 is an isometric view of a disc brake incorporating a mounting of the present teachings.
Figure 2:
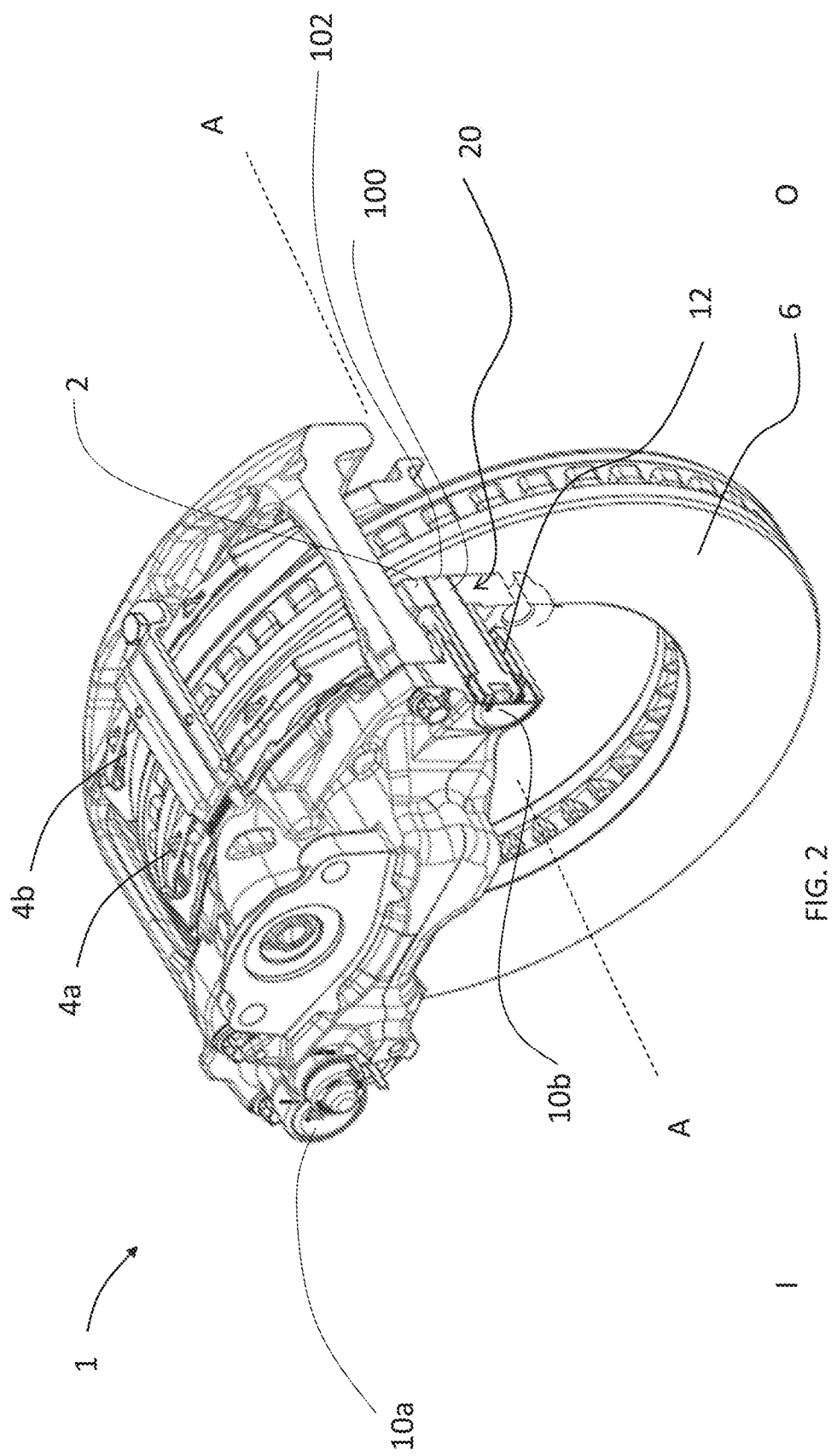
FIG. 2 is an isometric view of the disc brake of FIG. 1 from an inboard direction, sectioned through the mounting.
Figure 3:
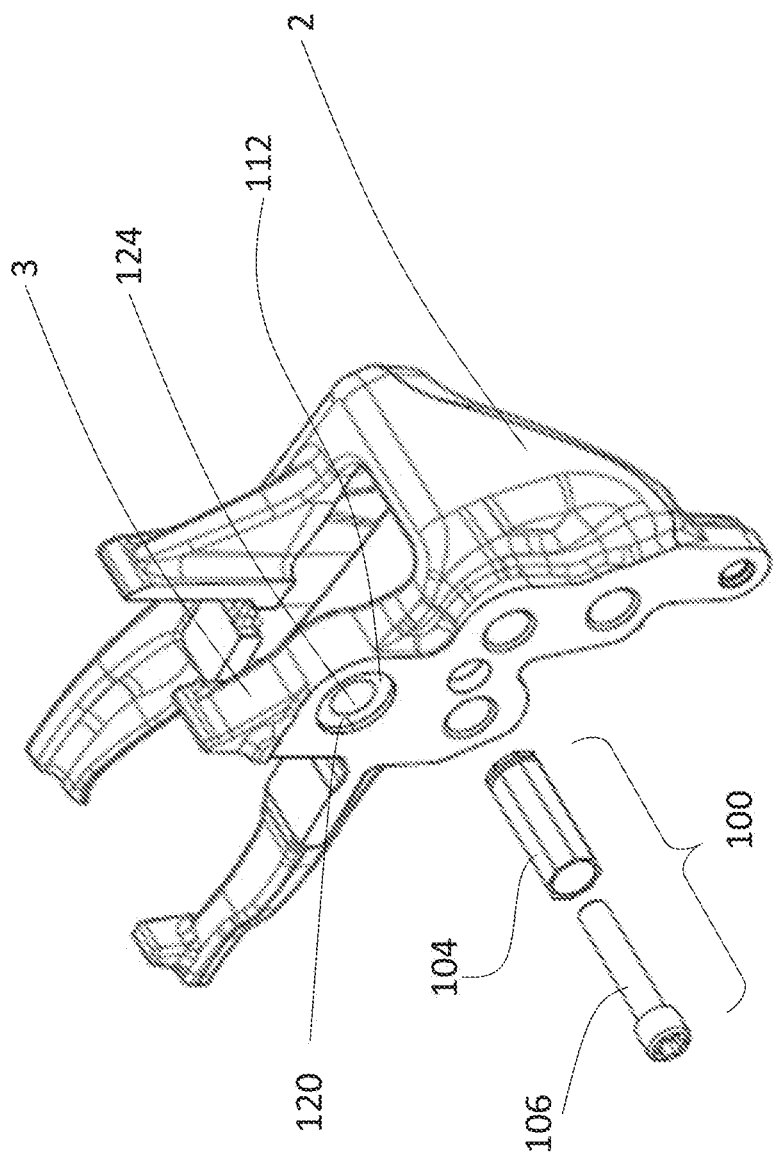
FIG. 3 is an exploded isometric view of the carrier of the disc brake of FIG. 1 from an inboard direction.
Figure 4:
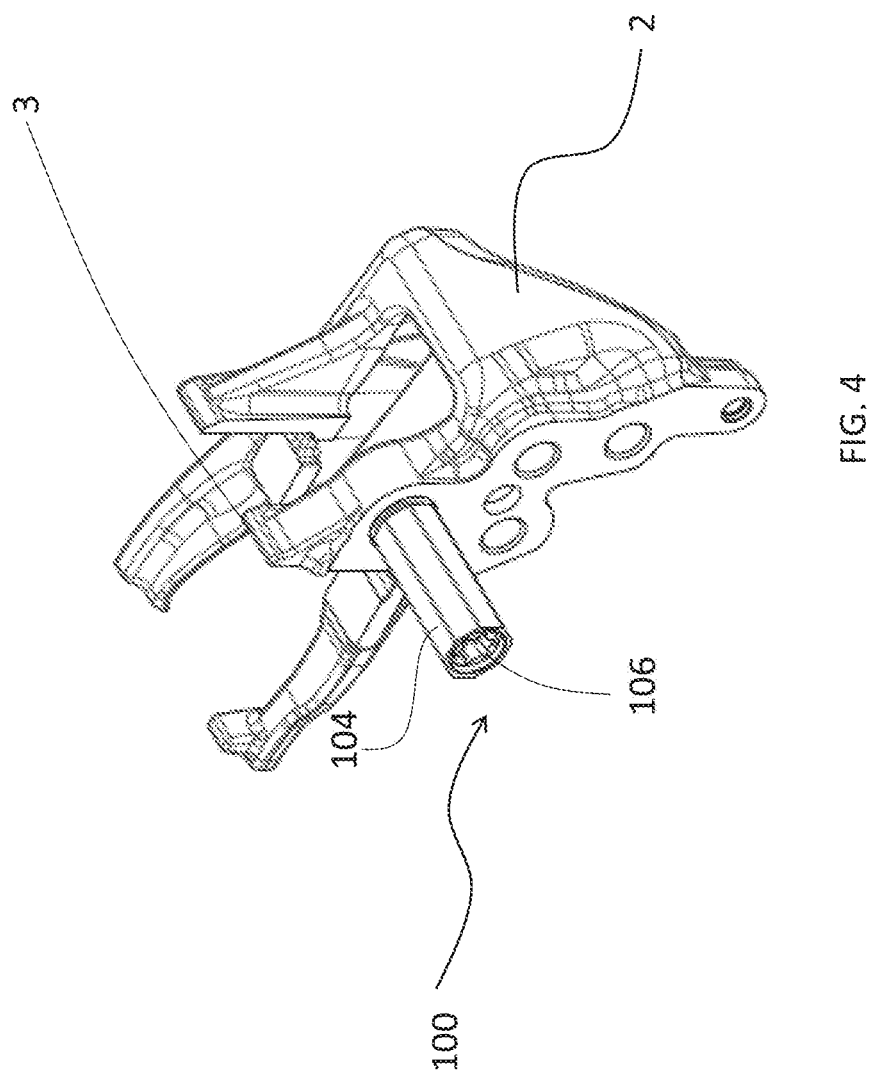
FIG. 4 is an assembled isometric view of the components of FIG. 3.
Figure 5:
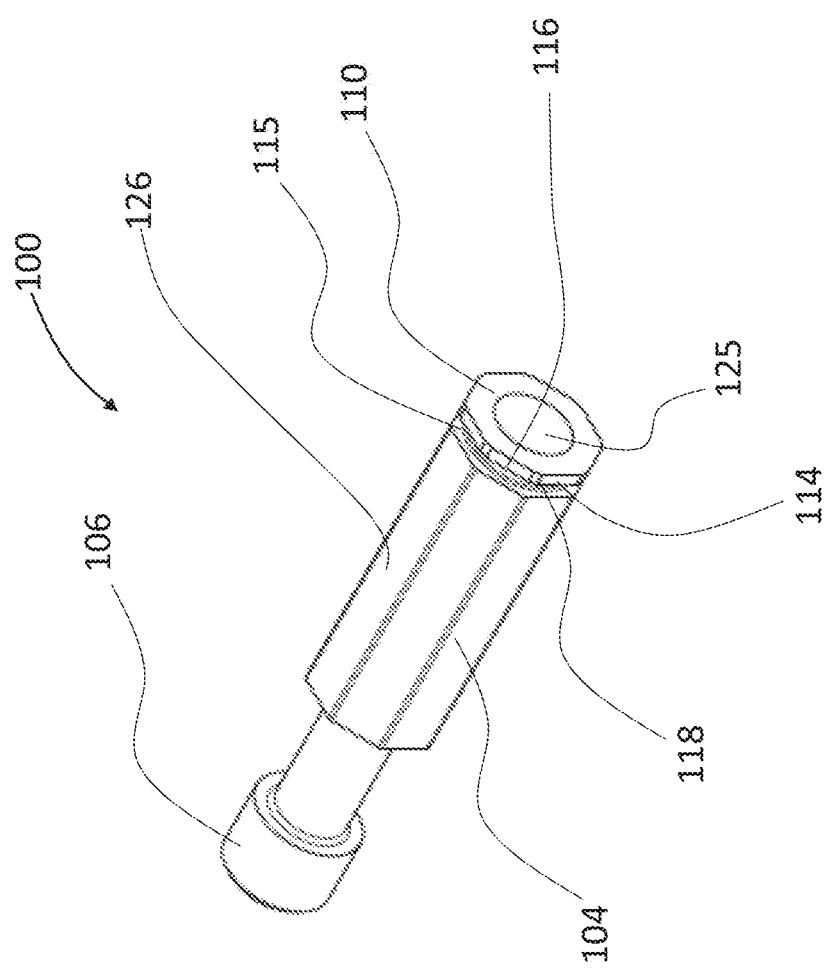
FIG. 5 is an isometric view of the guide pin shown in FIGS. 3 and 4.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIGS. 1 to 17, a disc brake of the present teachings is indicated generally at 1.

Various orientations of the disc brake are described. In particular the directions inboard I and outboard O refer to the typical orientation of the disc brake when fitted to a vehicle and with reference to the longitudinal center line of the vehicle. The radial direction refers to an orientation with reference to the center of the brake rotor (axis A-A) and is for example the direction in which brake pads may be fitted and removed from a disc brake. The circumferential direction C refers to a tangent to the direction of the rotation of the rotor and is for example the direction in which a friction induced load from a brake pad is laterally transmitted into an abutment of a brake carrier.

The disc brake 1 comprises a brake carrier 2. The brake carrier 2 carries an inboard brake pad 4a and an outboard brake pad 4b. A brake rotor 6 is positioned between the brake pads and is rotatable about the axis A-A. A brake caliper 8 is slidably mourned on the brake carrier 2.

The disc brake 1 comprises at least one guide assembly. In the depicted embodiment the disc brake 1 comprises two guide assembles 10a, 10b. The guide assemblies slidably support the brake caliper 8 and allow the brake caliper to slide in an inboard-outboard direction relative to the brake carrier 2.

Each guide assembly 10a, 10b comprises a guide pin 100 and retaining bore 102 formed in the brake carrier 2. The guide pin 100 is mounted on the brake carrier 2 in the retaining bore 102 and extends from the inboard-side of the brake carrier into a respective sliding bore 12 of the brake caliper 8. A mounting 20 is provided for each guide pin 100. Each mounting 20 comprises a mounting portion 110 of the guide pen 100 and a receiving portion 112 of the brake carrier 2 configured to receive the mounting portion.

The guide pins 100 are mounted to a portion of the carrier 2 that extends radially outwardly to form an abutment 3. This is a strong part of the carrier with sufficient space to form such a mounting. The abutment takes 3 the (circumferentially directed) braking load from the inboard brake pad 4a under braking and transmits it to the carrier.

As depicted, one of the guide pins may be shorter than the other guide pin in order to accommodate vehicle installation constraints and/or because one acts the primary guide on the leading edge in normal direction of rotation and the other acts as a secondary guide. In an alternative embodiment the guide pins may be of equal length.

The disc brake further comprises an actuator 11 for moving the inboard brake pad 4a into frictional contact with the brake rotor 6 when the disc brake is actuated (via a suitable mechanism (not shown) located within the caliper 8). When the inboard brake pad 4a is pushed by the actuator 11 into contact with the brake rotor 6, a reaction force F drives the brake caliper 8 to slide inboard relative to the brake carrier 2. As the brake caliper 8 slides inboard towards the brake carrier 2, it moves the outboard brake pad 4b towards the brake rotor 6. Hence, the brake rotor 6 becomes clamped between the inboard and outboard brake pads 4a, 4b, and the rotation of the brake rotor is frictionally inhibited.

An embodiment of the present teachings is depicted in FIGS. 2 to 6. The mounting portion 110 (FIG. 5) has a first, in this case polygonal, cross-sectional profile. The receiving portion 112 has a second cross-sectional profile that is different to the first cross-sectional profile of the mounting portion 110. The receiving portion 112 may be a through-bore, or a recess with a closed end. In this embodiment, the receiving portion is a substantially circular recess 112 of the brake carrier 2.

Figure 6:
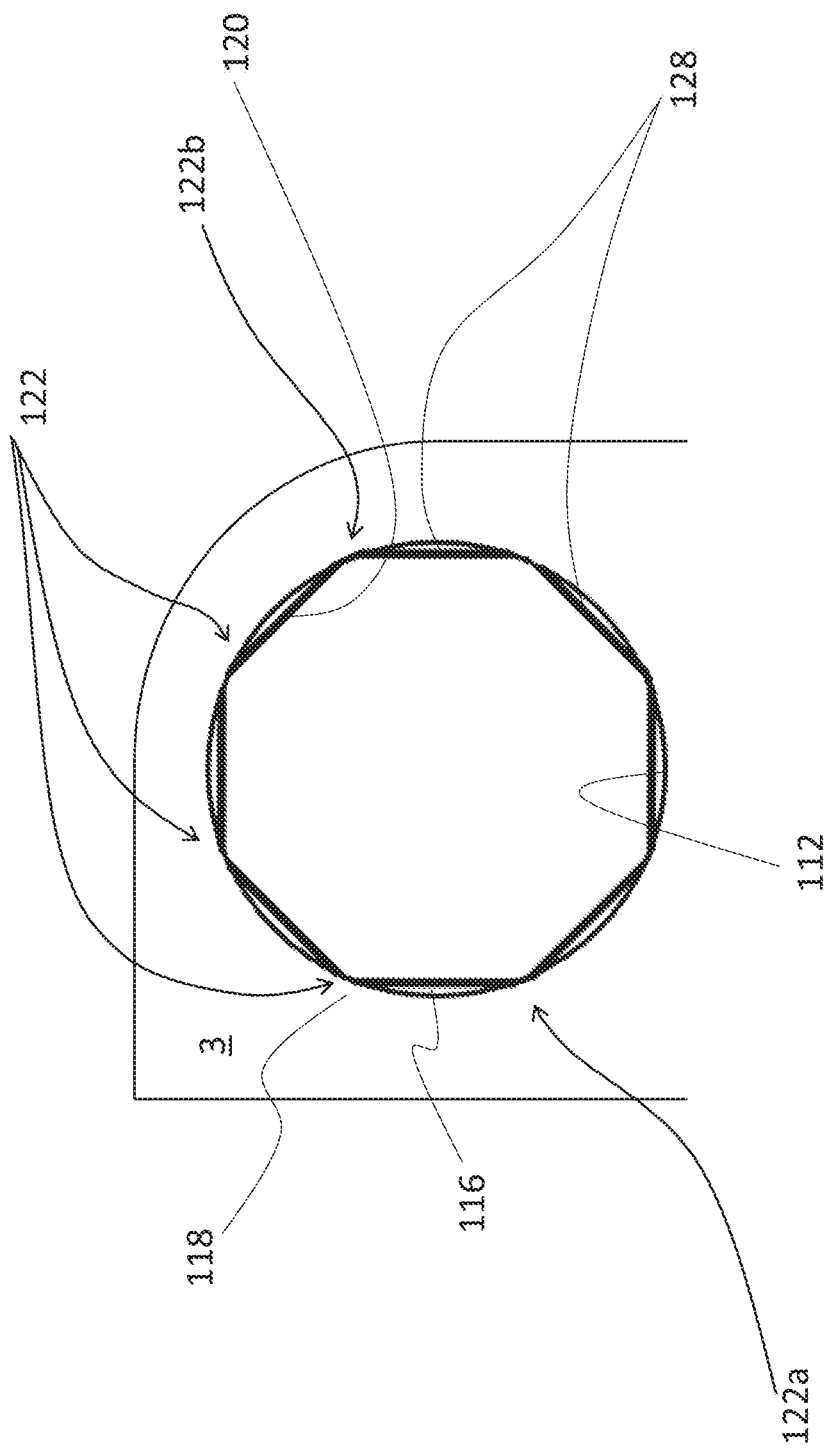
FIG. 6 is a simplified elevation view of the mounting.

As shown in the figures, the mounting portion 110 of this embodiment has a substantially octagonal profile, having an octagonal outer edge 114. The outer edge 114 has a series of eight edge faces 116. Intersections 118 are formed between each adjacent pair of edge faces 116. The intersections 118 abut an inner surface 120 of the receiving portion 112 to form an interference engagement, as shown in FIG. 6. The intersections 118 thus provide mating edge regions 122. The difference between the first and second cross-sectional profiles allows the interference engagement of the mating edge regions 122 and the receiving portion 112.

The opposing intersections 118, arranged as they are about the octagonal profile of the mounting portion 110, provide pairs of opposing mating edge regions 122a, 122b (see FIG. 6). The opposing edge regions 122a, 122b act together to ensure that the interference engagement is secure. In FIG. 6 an exaggerated example of the overlap between the intersections 118 and receiving portion 112 is shown, this overlap being deformed to create the interference engagement.

In this embodiment, where the mating edge region is provided by the intersections 118, non-mating regions 128 are created between the intersections 118, where there is a clearance between the mounting portion 110 and the receiving portion 112. Here, the clearance is defined by the edge faces 116. The clearance improves ease of fitting of the guide pin 100 to the brake carrier 2.

In this embodiment, the intersections 118 are curved. In alternative embodiments, the intersections are pointed or chamfered.

In this embodiment, the mating edge regions 122 are deformable, so that the mounting portion 110 deforms to create the interference engagement. The intersections 118 deform as the mounting portion is located in the receiving portion by compression, to create the interference engagement. In an alternative embodiment, the receiving portion 112 is deformable, so that the receiving portion deforms to create the interference engagement, or both the receiving portion and the mounting portion 110 are deformable.

In this embodiment each guide pin 100 comprises a guide sleeve 104 and a threaded bolt 106. The mounting portion 110 is a flange of the guide sleeve 104. The perimeter of the flange has a polygon shaped profile, in this embodiment the substantially octagonal profile described above. In this embodiment, a threaded bore 124 extends through the recess 112 to receive the threaded bolt 106.

The guide sleeve is provided with a through-bore 125 has a step (not visible) between a smaller diameter section to accommodate a shank of the bolt and a larger diameter section to accommodate a head of the bolt. Consequently, when the bolt is inserted through the guide sleeve 124 and tightened into the threaded bore 124, the guide sleeve is placed into compression. This forces the mounting portion 110 into the interference engagement with the receiving portion 112 when a suitable torque is applied to the bolt 106.

In this embodiment, the profile of a body 126 of the guide sleeve 104 is substantially octagonal and corresponds to the profile of the flange that provides the mounting portion 110. The flange and body are separated in this embodiment by an annular recess 115 that may act as a mount for a convoluted boot or seal (not shown) that protects the body 126 from foreign matter that may cause corrosion and/or inhibit sliding. However, in alternative embodiments the annular recess may be omitted and/or the profile of the main body of the guide sleeve is different to that of the mounting portion.

Figure 7:
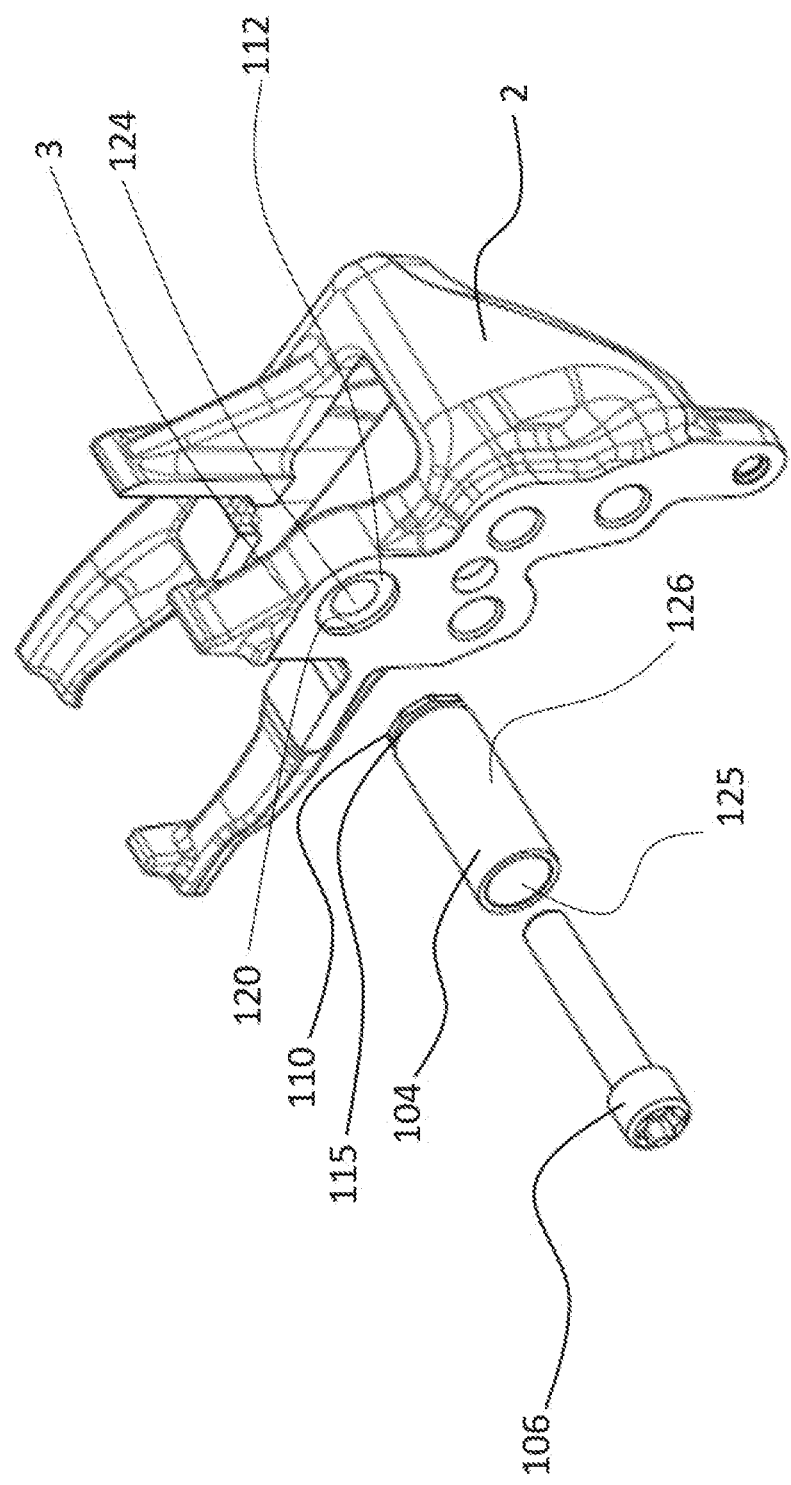
FIG. 7 is an exploded isometric view of a mounting according to a second embodiment of the teachings.

For example, FIG. 7 shows an alternative embodiment where the profile of the main body 126 of the guide sleeve 104 is substantially circular, yet the profile of the flange 110 is substantially octagonal. In alternative embodiments, the profile of the main body of the guide sleeve is of some alternative shape, such as substantially triangular, square, rectangular, hexagonal, or some irregular polygonal shape.

Figure 8:
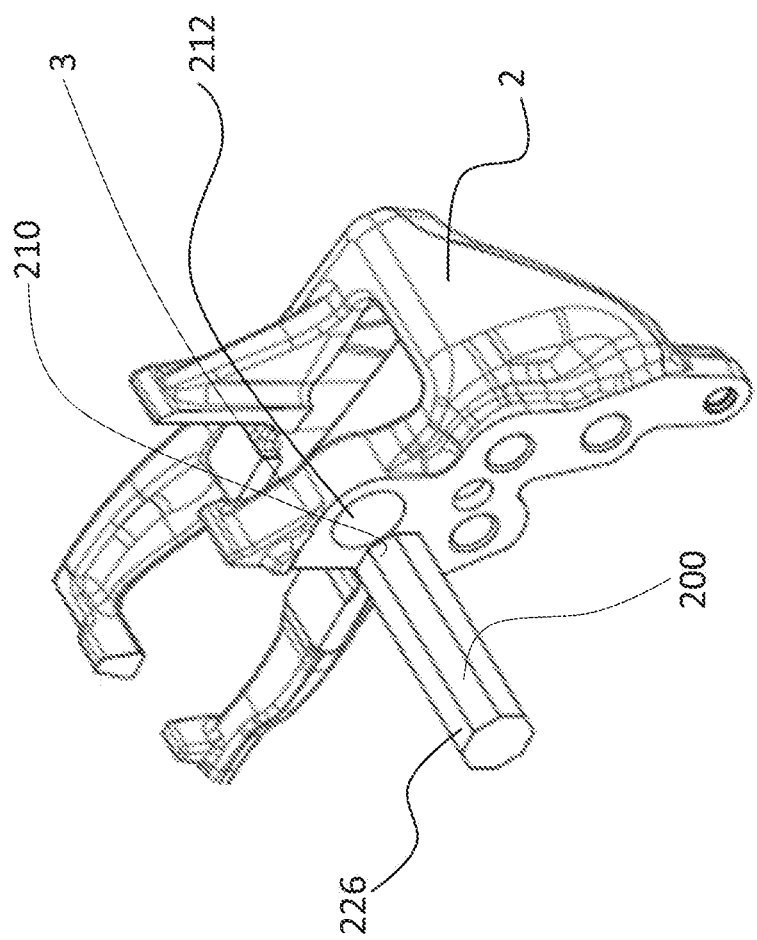
FIG. 8 is an exploded isometric view of a mounting according to a third embodiment of the teachings.

FIG. 8 depicts a further embodiment where features corresponding to those of the previous embodiment have been given corresponding reference numbers with the additional prefix "2". Only features that differ from those of the previous embodiment are discussed in more depth.

In the embodiment of FIG. 8, the guide pin 200 comprises a monolithic body. The mounting portion 210 is an end of the guide pin 200 having a polygonal profile. In this embodiment, the mounting portion 210 has a substantially octagonal profile. As in the previous embodiments, the receiving portion 212 is substantially circular in profile. As in the previous embodiments, the mounting portion 210 is configured to form an interference engagement with the receiving portion 212. The intersections 218 in this embodiment are pointed rather than being chamfered or curved.

In this embodiment a suitable press may be used to mount the guide pin 200 into the receiving portion. The fitting process may be aided by differentially heating or cooling the components. For example, the guide pin 200 may be cooled using a suitable cryogenic material such as liquid nitrogen to shrink-fit it within the receiving portion 212. Alternatively, one or both of the guide pin 200 and carrier 2 may be heated so the material becomes softer and easier to deform.

The guide pin 200 of the embodiment of FIG. 8 has a constant cross-sectional profile—i.e., the body 226 has the same cross-section as the mounting portion 210. In this embodiment the mounting portion 210 and body 226 are not separated by an annular recess, but this is contemplated in alternative embodiments.

In alternative embodiments, depicted in FIGS. 9, 10, 13, 14, and 15 the monolithic guide pins 200', 200', 300, 400 have a constant cross-sectional profile of some alternative shape. In the embodiments FIGS. 11, 12, 16 and 17, the cross-section profile of the guide pins 200", 200'", 500 is not constant because it is interrupted by an annular recess and/or the body has a different profile to the mounting portion. However, in each of these embodiments, the receiving portion has a profile configured to form an interference engagement with each respective mounting portion.

Figure 9:
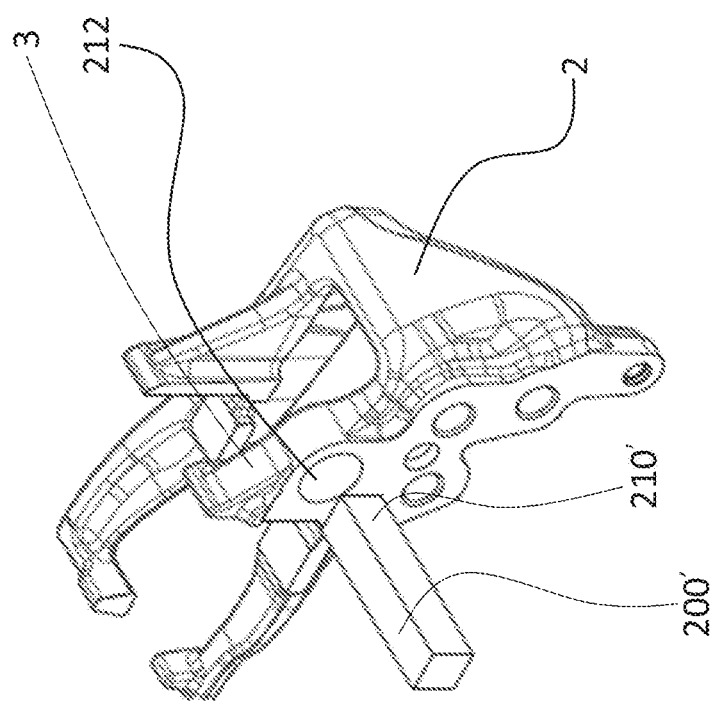
FIG. 9 is an exploded isometric view of a mounting according to a fourth embodiment of the teachings.
Figure 10:
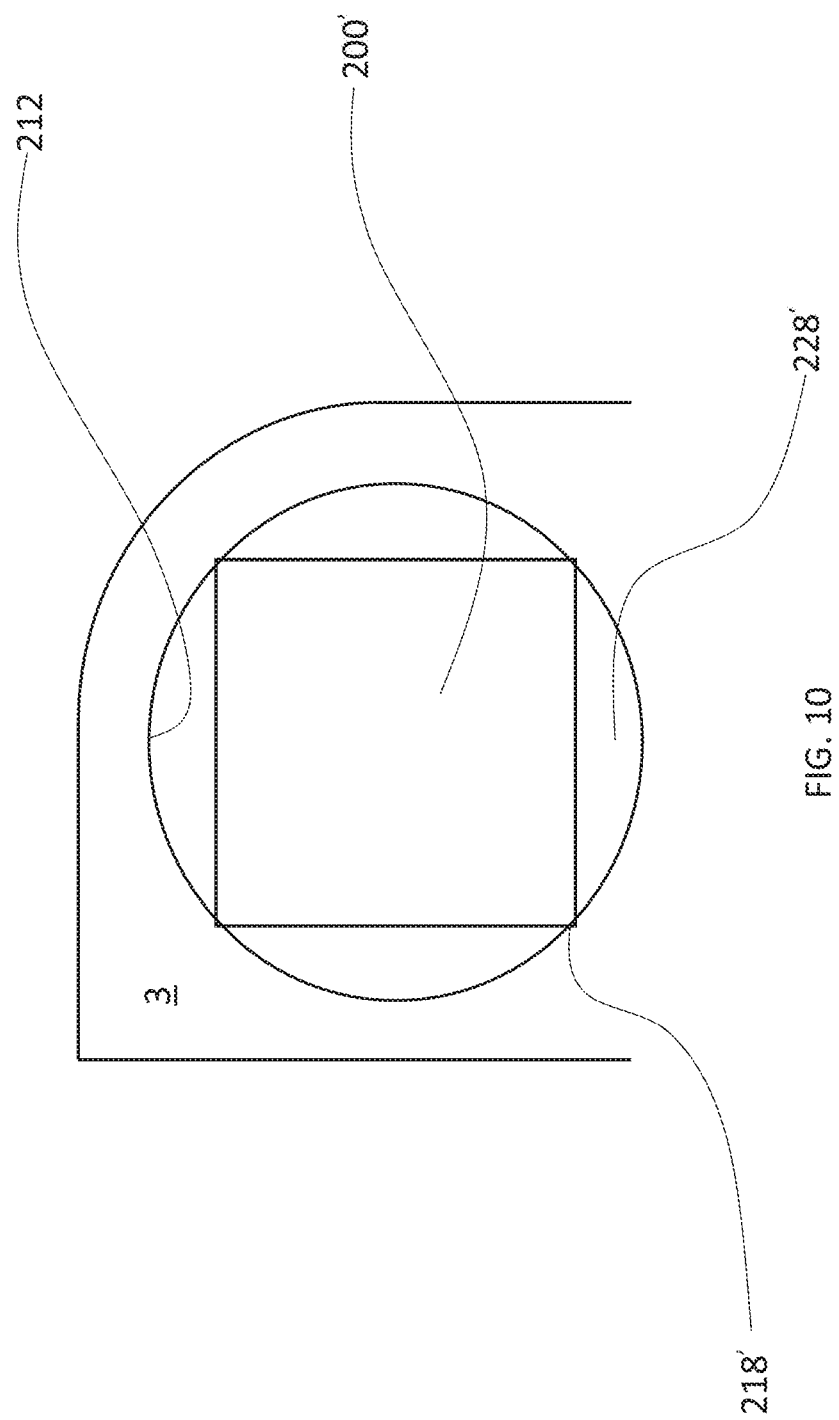
FIG. 10 is a partial simplified front view of the brake carrier and mounting of FIG. 9.

In the embodiment of FIGS. 9 and 10, the guide pin 200', including the mounting portion 210', has a substantially square profile. In this embodiment, the receiving portion 212 has a substantially circular profile. This defines four non-mating regions 228' and four intersections 218' where the interference engagement occurs. The intersections 218' are pointed in this embodiment.

Figure 11:
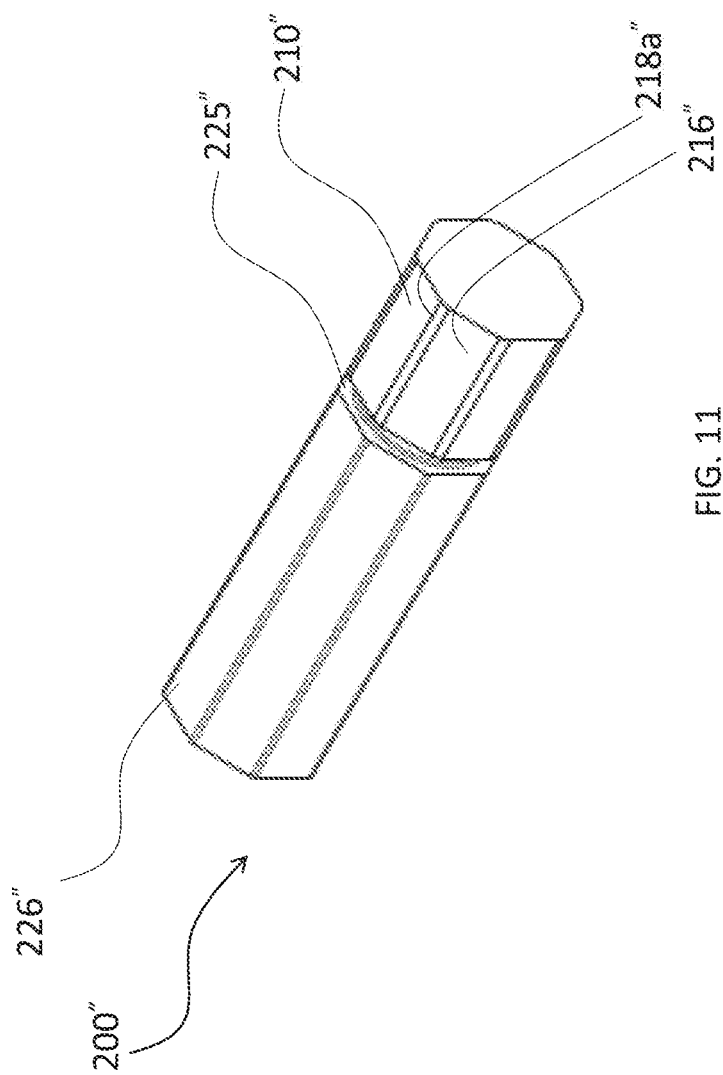
FIG. 11 is an isometric view of a guide pin according to a fifth embodiment.
Figure 12:
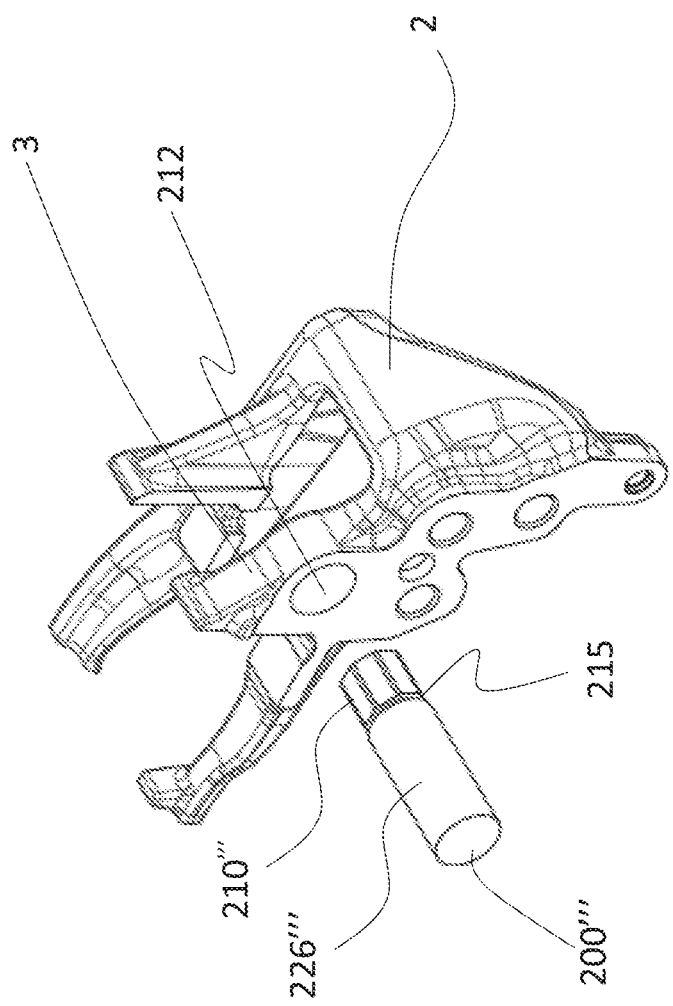
FIG. 12 is a partial, exploded, isometric view of a brake carrier with a mounting and a guide pin according to a sixth embodiment.

FIGS. 11 and 12 show a two further embodiments in which the mating edge region is provided by an octagonal profile where chamfered intersections 218" (flattened intersections that have a significantly smaller area—five or more times smaller—than the intervening edge faces 216", and therefore do not constitute edge faces in their own right). In FIG. 11 the body portion 226" is also octagonal, but with chamfered intersection of a smaller area. By contrast the body portion 226''' is cylindrical in FIG. 12.

Figure 13:
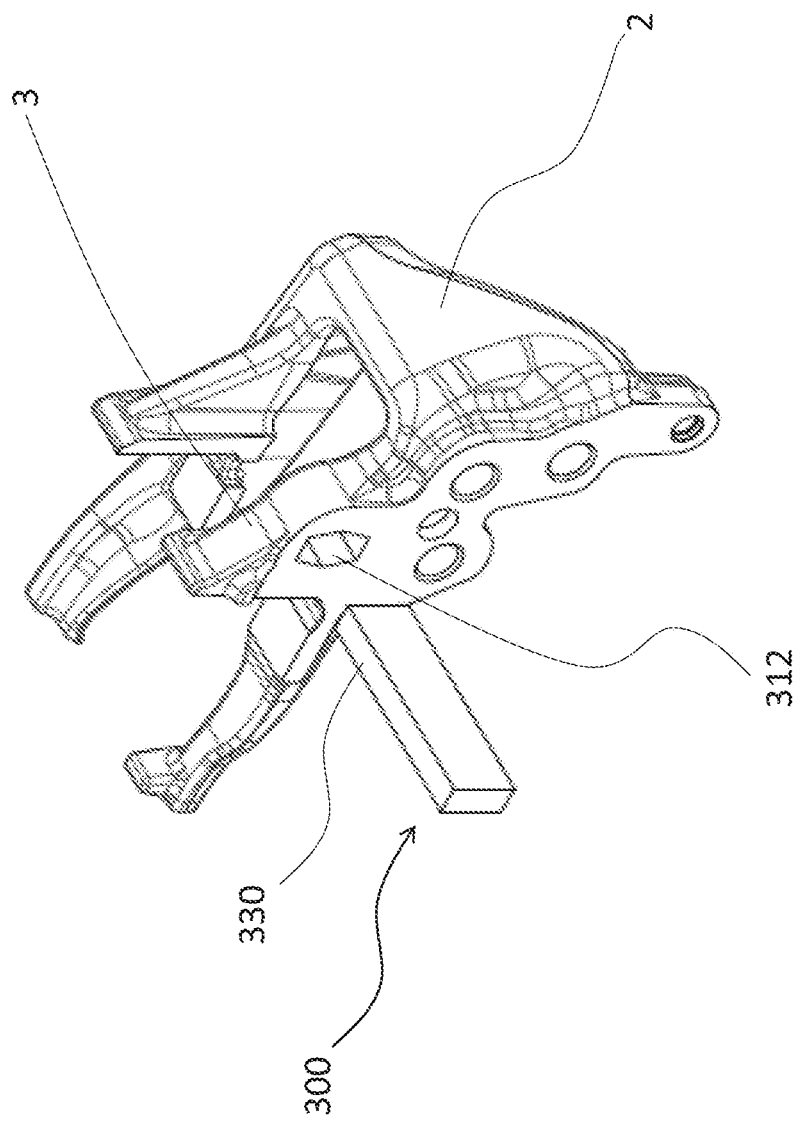
FIG. 13 is a partial, exploded, isometric view of a brake carrier with a mounting and a guide pin according to a seventh embodiment.
Figure 14:
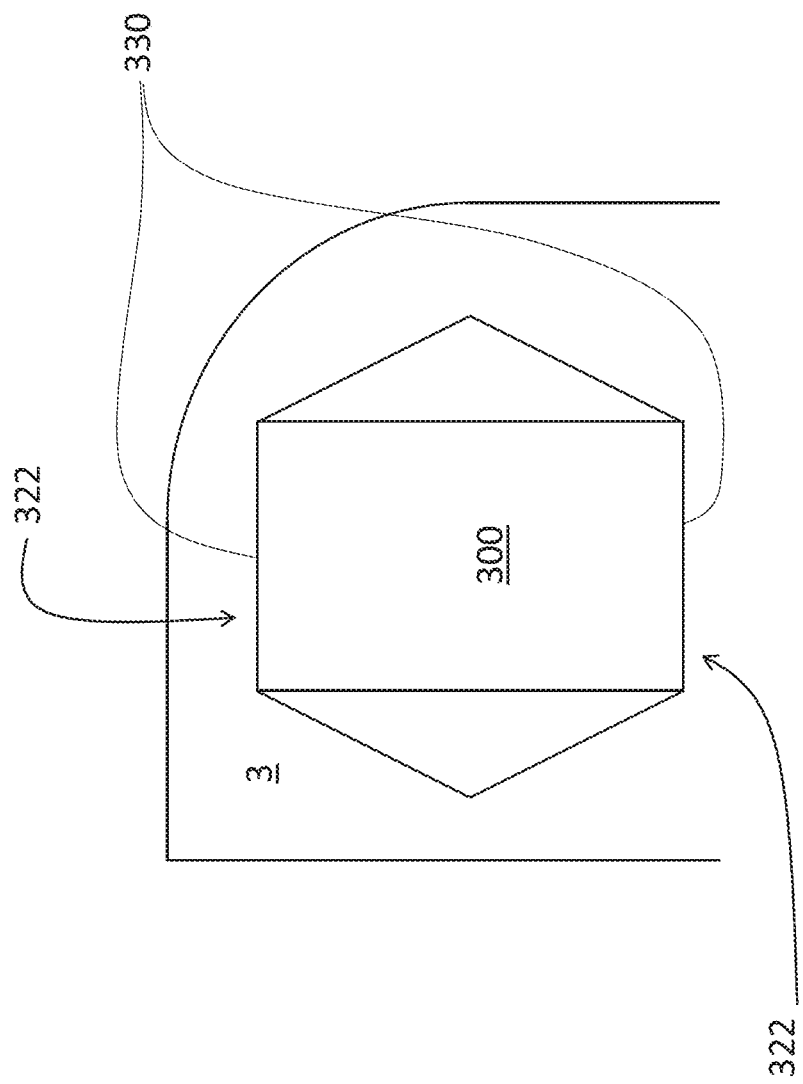
FIG. 14 is a partial simplified front view of the brake carrier and mounting of FIG. 13.

In the embodiment of FIGS. 13 and 14, the guide pin 300 is monolithic and constant in cross-section, having a substantially rectangular cross-sectional profile with opposing upper and lower faces 330 forming the short sides of the rectangular profile. In this embodiment, the receiving portion 312 is substantially hexagonal in cross-section. Opposing (upper and lower) sides of the receiving portion 312 provide mating edge regions 322 with the upper and lower faces 330 of the guide pin 300.

Figure 15:
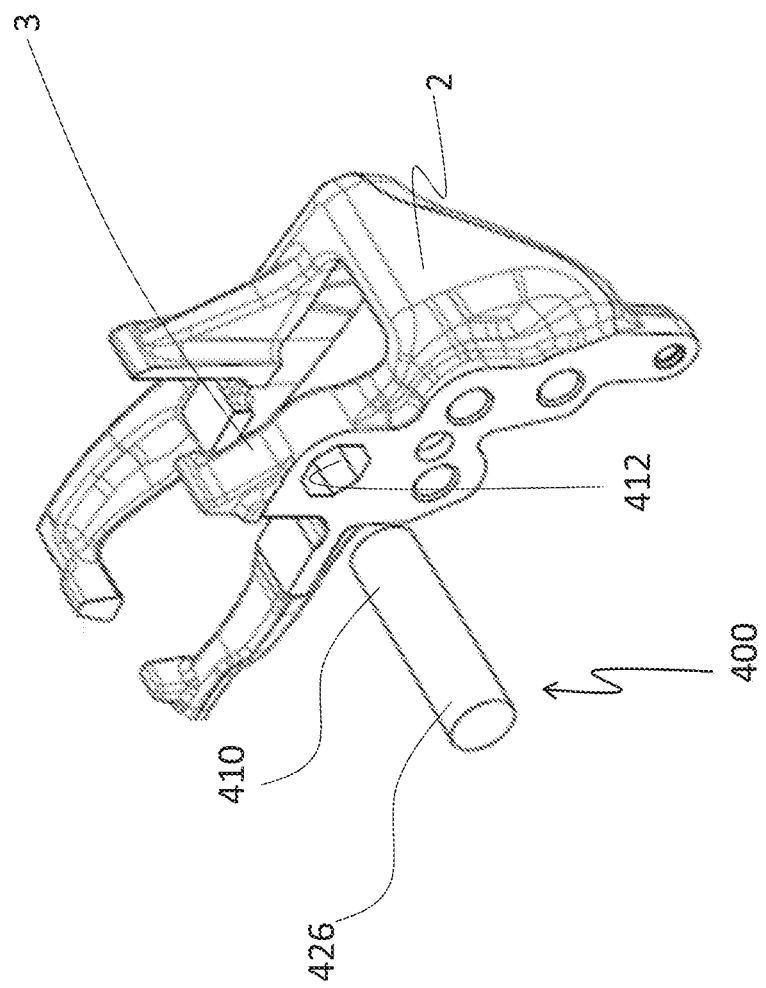
FIG. 15 is a partial, exploded, isometric of a brake carrier with a mounting and a guide pin according to an eighth embodiment.

In the embodiment of FIG. 15, the receiving portion 412 has a hexagonal cross-sectional profile and the guide pin 400 is cylindrical.

Figure 16:
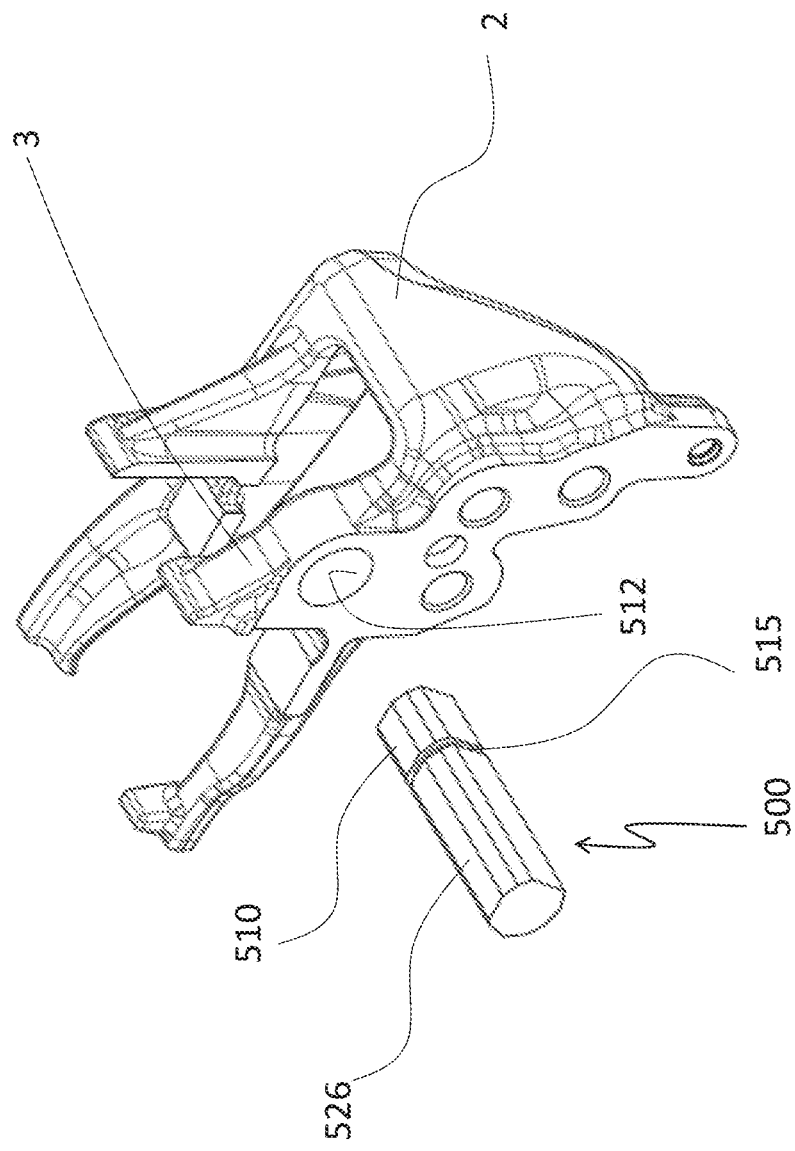
FIG. 16 is a partial, exploded, isometric view of a brake carrier with a mounting and a guide pin according to a ninth embodiment.
Figure 17:
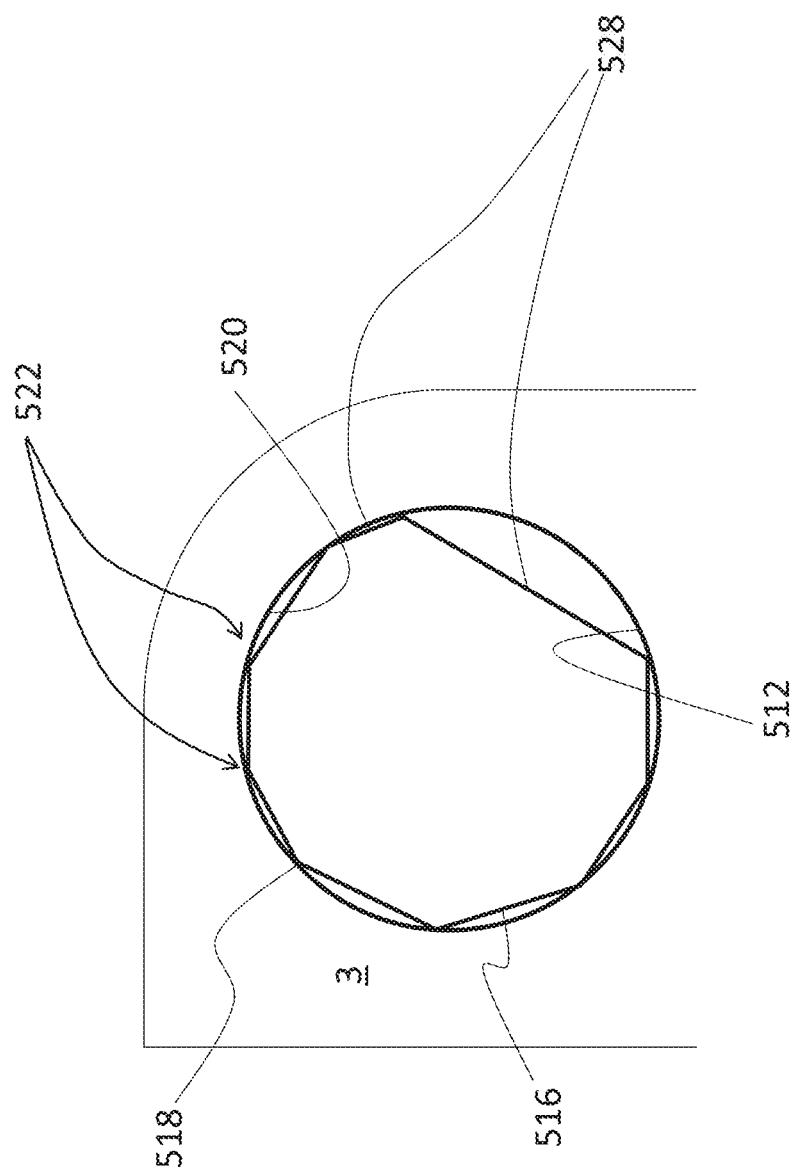
FIG. 17 is a partial simplified front view of the brake carrier and mounting of FIG. 16.

FIGS. 16 and 17 shows a further embodiment of a monolithic guide pin 500 and carrier 2, in which the receiving portion 512 of the carrier has a circular cross-sectional profile and the guide pin 500 has an unequal nine-sided profile with pointed intersections 518. Each of the edge faces 516 is planar, but with different surface areas and different angles between each face. This arrangement may be used to optimize the engagement to provide maximum resistance to the loads transmitted via the guide pin in the locations where it is most required. Additionally or alternatively, the shape may be configured to provide different sized voids of the non-mating regions 528 in order to accommodate other components within this space—e.g., a wear sensor (not shown).

As shown in the various embodiments described herein, the mounting portion of the guide pin can be of various profiles. The mounting portion profile is in alternative embodiments, a regular polygon or an irregular polygon. The mounting portion profile is in alternative embodiments substantially triangular, square or hexagonal in profile. In each case where the mourning portion and/or receiving portion is polygonal, it should be noted that the sum of the exterior angles between adjacent edge faces is 360° and none of the interior angles is greater than 180°. In other words, the polygonal shapes within the teachings are regular or irregular convex polygons. This may be contrasted with other arrangements where there is knurling or the like at the interface. In such cases the exterior angles will not sum to 360°, some interior angles are greater than 180° and each face is a small proportion of the area of the mounting portion, for example.

In alternative embodiments, the receiving portion can have a different, i.e., non-circular profile, and is in alternative embodiments a regular polygon or an irregular polygon and/or is substantially square, triangular, hexagonal or octagonal.

Any voids between the guide pin and carrier may be filled, e.g., by a suitable resin filler, to inhibit the collection of foreign matter or corrosion therein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A mounting for a guide pin of a disc brake, wherein the guide pin is configured to slidably support a disc caliper when mounted, the mounting comprising:
   a mounting portion of the guide pin that includes a first polygonal cross-sectional profile; and
   a receiving portion of a brake carrier configured to receive the mounting portion, the receiving portion including a second cross-sectional profile that has a different configuration than the first polygonal cross-sectional profile of the mounting portion; and
   wherein the mounting portion includes a mating edge region configured to form an interference engagement with the receiving portion when the mounting portion is received in the receiving portion.

2. The mounting of claim 1 wherein the mating edge region is formed on an edge face of the mounting portion.

3. The mounting of claim 1 wherein the mating edge region comprises an intersection formed between adjacent edge faces of the mounting portion.

4. The mounting of claim 1 wherein the mating edge region, the receiving portion, or both are deformable.

5. The mounting of claim 1 wherein the mounting portion comprises a first mating edge region and a second, opposing mating edge region.

6. The mounting of claim 1 wherein the mounting portion comprises at least one non-mating region configured to form a clearance between the mounting portion and the receiving portion when the mounting portion is received in the receiving portion.

7. The mounting of claim 6 wherein the clearance is defined between an edge face of the mounting portion and inner edge of the receiving portion.

8. The mounting of claim 1 wherein the mounting portion has a regular polygonal cross-sectional profile or an irregular polygonal cross-sectional profile.

9. The mounting of claim 1 wherein the mounting portion has a convex polygonal profile.

10. The mounting of claim 1 wherein the second cross-sectional profile of the receiving portion is substantially circular or is polygonal.

11. A disc brake comprising:
   a brake caliper;
   a guide pin that extends from the brake caliper, the guide pin including a mounting portion that has a first polygonal cross-sectional profile and a mating edge region; and
   a brake carrier having a receiving portion that receives the mounting portion, the receiving portion including a second cross-sectional profile that has a different configuration than the first polygonal cross-sectional profile, wherein the mating edge region has an interference engagement with the receiving portion when the mounting portion is received in the receiving portion and wherein the guide pin is mounted to the brake carrier.

12. The disc brake of claim 11 wherein the guide pin has a constant polygonal cross-sectional profile substantially along its length.

13. The disc brake of claim 11 wherein the guide pin comprises a sleeve and a fastener that secures the sleeve to the brake carrier, wherein the sleeve comprises the mounting portion.

14. The disc brake of claim 13 wherein the mounting portion is a flange arranged at a first end of the sleeve.

15. The disc brake of claim 11 wherein the guide pin comprises a monolithic body, and wherein the mounting portion is arranged at a first end of the monolithic body.

16. A method of mounting a guide pin of a disc brake, the method comprising:
- providing a mounting portion of the guide pin that has a first polygonal cross-sectional profile and a mating edge region;
- providing a receiving portion of a brake carrier that has a second cross-sectional profile that has a different configuration than the first polygonal cross-sectional profile; and
- locating the mounting portion in the receiving portion and forming an interference engagement between the mating edge region and the receiving portion.

* * * * *